United States Patent
Zhao et al.

(10) Patent No.: US 11,038,424 B2
(45) Date of Patent: *Jun. 15, 2021

(54) DIRECT CURRENT-DIRECT CURRENT CONVERTER

(71) Applicant: Silergy Semiconductor Technology (Hangzhou) LTD, Hangzhou (CN)

(72) Inventors: Chen Zhao, Hangzhou (CN); Wang Zhang, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/693,568

(22) Filed: Nov. 25, 2019

(65) Prior Publication Data

US 2020/0099303 A1    Mar. 26, 2020

Related U.S. Application Data

(63) Continuation of application No. 16/196,577, filed on Nov. 20, 2018, now Pat. No. 10,523,121.

(30) Foreign Application Priority Data

Dec. 26, 2017  (CN) .......................... 201711437539.3

(51) Int. Cl.
    *H02M 3/07*    (2006.01)
    *H02M 3/158*   (2006.01)
    (Continued)

(52) U.S. Cl.
    CPC .......... *H02M 3/1582* (2013.01); *H02M 3/07* (2013.01); *H02M 3/156* (2013.01); *H02M 3/158* (2013.01);
    (Continued)

(58) Field of Classification Search
    CPC ...... H02M 3/1582; H02M 3/07; H02M 3/156; H02M 3/158; H02M 3/1588; H02M 2001/0003; H02M 2001/007
    See application file for complete search history.

(56) References Cited

U.S. PATENT DOCUMENTS 5,581,429 A    12/1996  Furuichi et al.
7,696,735 B2   4/2010   Oraw et al.
(Continued)

FOREIGN PATENT DOCUMENTS

TW    201543798 A    11/2015

OTHER PUBLICATIONS

Masatoshi Uno, High Step-Down Converter Integrating Switched Capacitor Converter and PWM Synchronous Buck Converter, Oct. 17, 2013, pp. 273-278, 35th International Telecommunications Energy Conference, Smart Power and Efficiency.
(Continued)

*Primary Examiner* — Gary L Laxton
(74) *Attorney, Agent, or Firm* — Michael C. Stephens, Jr.

(57) ABSTRACT

A DC-DC converter can include: a switched capacitor converter including at least one switch group and at least one capacitor, where each switch group includes two switches coupled in series, and at least one capacitor is respectively coupled in parallel with a corresponding one of the switch groups; and a switch converter including a first magnetic component, where the switch converter is configured to share one of the switch groups, the first magnetic component is coupled to an intermediate node of the shared switch group, and the intermediate node is a common coupling point of two switches of the shared switch group.

14 Claims, 9 Drawing Sheets

(51) Int. Cl.
*H02M 3/156* (2006.01)
*H02M 1/00* (2006.01)

(52) U.S. Cl.
CPC .. *H02M 3/1588* (2013.01); *H02M 2001/0003* (2013.01); *H02M 2001/007* (2013.01)

(56) References Cited

U.S. PATENT DOCUMENTS

| | | | |
|---|---|---|---|
| 7,907,429 B2 | 3/2011 | Ramadass et al. | |
| 8,089,788 B2 | 1/2012 | Jain | |
| 8,212,537 B2 | 7/2012 | Carpenter et al. | |
| 8,427,113 B2 | 4/2013 | Xing et al. | |
| 8,687,382 B2 | 4/2014 | Chen | |
| 8,729,819 B2 | 5/2014 | Zhou et al. | |
| 8,867,295 B2 | 10/2014 | Mera et al. | |
| 8,917,528 B2 | 12/2014 | Xu | |
| 9,048,727 B2 * | 6/2015 | Giuliano | H02M 3/158 |
| 9,287,782 B2 | 3/2016 | Chen | |
| 9,473,034 B2 | 10/2016 | Huang et al. | |
| 9,571,006 B2 | 2/2017 | Stahl et al. | |
| 9,762,128 B2 | 9/2017 | Zhang et al. | |
| 9,853,460 B2 | 12/2017 | Ichikawa et al. | |
| 10,523,121 B2 * | 12/2019 | Zhao | H02M 3/07 |
| 2012/0300519 A1 | 11/2012 | Clemmons et al. | |
| 2012/0326680 A1 | 12/2012 | Burns et al. | |
| 2013/0181620 A1 | 7/2013 | Zhao | |
| 2013/0201730 A1 | 8/2013 | Luo | |
| 2013/0265016 A1 | 10/2013 | Chang et al. | |
| 2018/0198367 A1 | 7/2018 | Zhang et al. | |
| 2019/0229623 A1 * | 7/2019 | Tsuda | H02M 3/073 |

OTHER PUBLICATIONS

Kou Mitsui, LLC Converter Combined with Switched Converter for High Voltage Applications, Oct. 23, 2013, pp. 1013-1017, Conference on Renewable Energy Research and Applications(ICRERA).

* cited by examiner

FIG. 9

DIRECT CURRENT-DIRECT CURRENT CONVERTER

RELATED APPLICATIONS

This application is a continuation of the following application, U.S. patent application Ser. No. 16/196,577, filed on Nov. 20, 2018, and which is hereby incorporated by reference as if it is set forth in full in this specification, and which also claims the benefit of Chinese Patent Application No. 201711437539.3, filed on Dec. 26, 2017, which is incorporated herein by reference in its entirety.

FIELD OF THE INVENTION

The present invention generally relates to the field of power electronics, and more particularly to direct current-direct current (DC-DC) converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
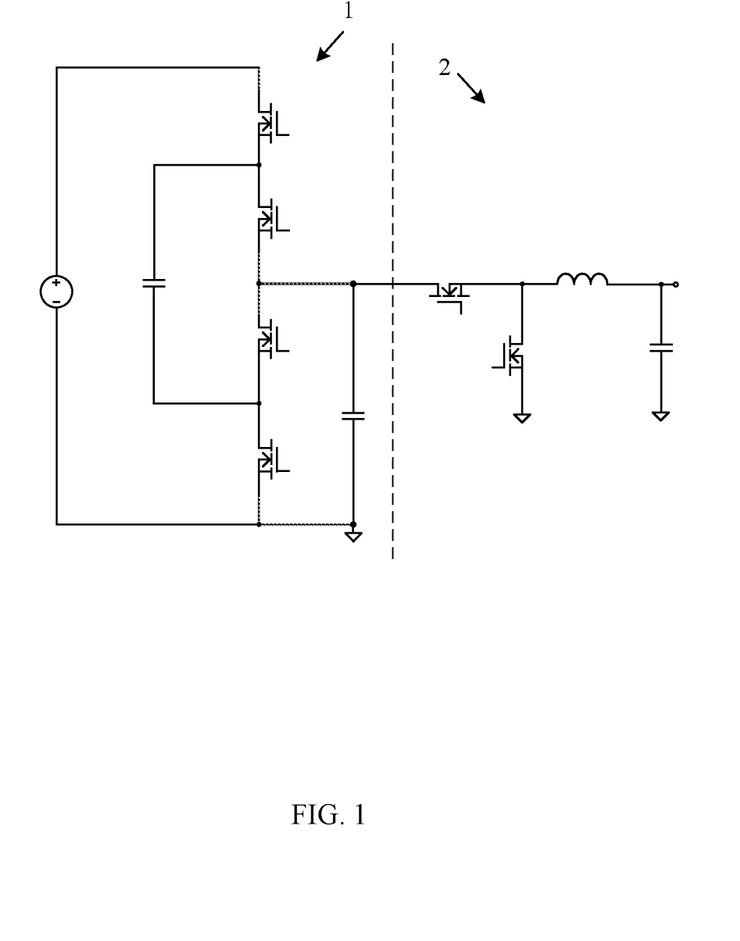
FIG. 1 is a schematic block diagram of an example DC-DC.

Referring now to FIG. 1, shown is a schematic block diagram of an example DC-DC. A switched capacitor converter may perform voltage conversion or current conversion by controlling the charge/discharge of capacitors through switches. However, a switched capacitor converter may only achieve voltage conversion with a constant transformation ratio. In addition, since there can be a relatively high and unexpected pulsation that may be generated in the current of an input power supply and other devices, a generated output voltage may also have such pulsation. In one approach, in order to achieve a voltage conversion with a changeable transformation ratio between an input voltage and an output voltage and to smooth the output voltage, a switch converter can be provided at a former stage or a later stage of the switched capacitor converter, which may be coupled in series to the switched capacitor converter. As shown in the example of FIG. 1, switched capacitor converter 1 can be used as an input stage, and switch converter 2 with a buck topology may be used as an output stage. One drawback of this approach, however, is a relatively large circuit scale/size.

In one embodiment, a direct current-direct current (DC-DC) converter can include: (i) a switched capacitor converter including at least one switch group and at least one capacitor, where each switch group includes two switches coupled in series, and at least one capacitor is respectively coupled in parallel with a corresponding one of the switch groups; and (ii) a switch converter including a first magnetic component, where the switch converter is configured to share one of the switch groups, the first magnetic component is coupled to an intermediate node of the shared switch group, and the intermediate node is a common coupling point of two switches of the shared switch group.

Figure 2:
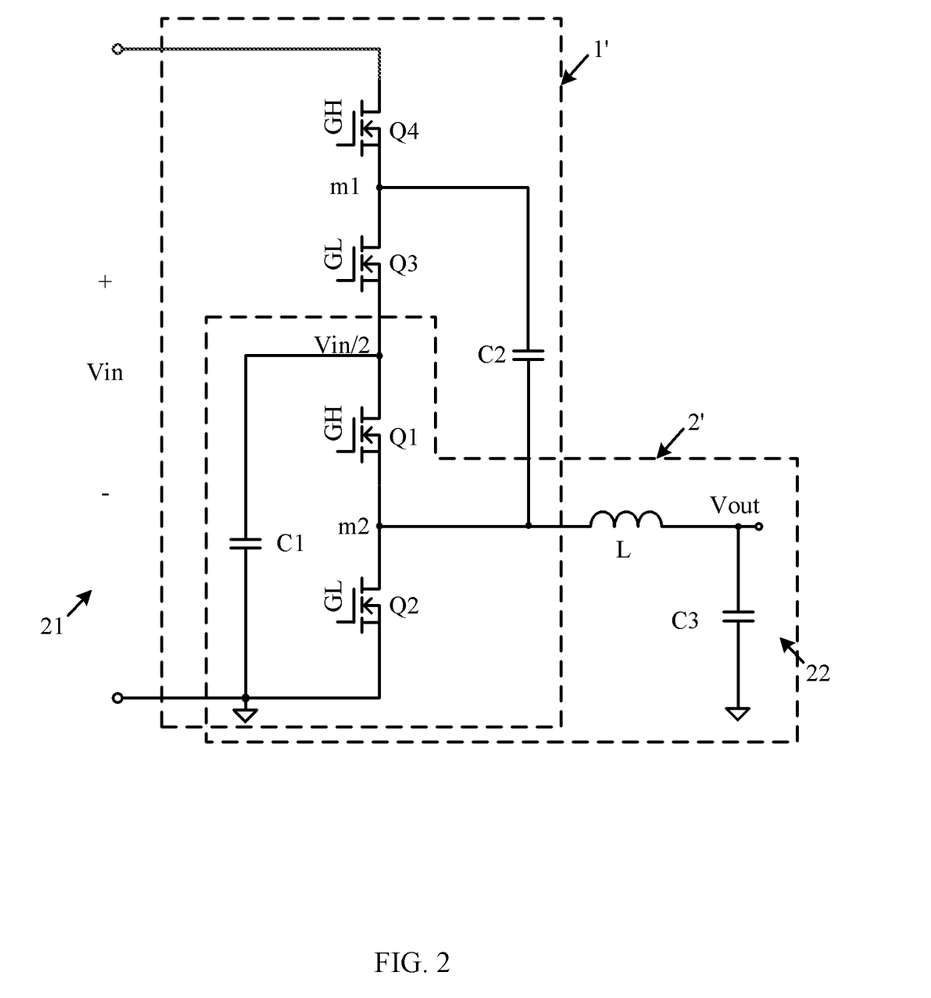
FIG. 2 is a schematic block diagram of a first example DC-DC converter, in accordance with embodiments of the present invention.

Referring now to FIG. 2, shown is a schematic block diagram of a first example DC-DC converter, in accordance with embodiments of the present invention. In this particular example, the DC-DC converter can include non-isolated switched capacitor converter 1' and switch converter 2'. Switch converter 2' may share a switch group in switched capacitor converter 1'. Switched capacitor converter 1' can include two switch groups: a switch group including switches Q1 and Q2 coupled in series, and a switch group including switches Q3 and Q4 coupled in series. In each switch group, two switches may be coupled in series. A common coupling point of the two switches may be defined as intermediate node mi of the switch group, where i=1, 2. For example, switches Q1 to Q4 are metal-oxide-semiconductor field-effect transistors (MOSFETs). In addition, other electronically controlled switch devices, such as a bipolar junction transistor (BJT) and an insulated gate bipolar translator (IGBT), may also be used as the switches in particular embodiments.

Switched capacitor converter 1' may further include capacitors C1 and C2. Capacitor C1 can connect in parallel with the switch group including switches Q1 and Q2. One terminal of capacitor C2 can connect intermediate node m1, and the other terminal of capacitor C2 can connect intermediate node m2. Switch converter 2' can include inductor L as a magnetic component, and capacitor C3 coupled between one terminal of the inductor and a ground. The other terminal of inductor L can connect to intermediate node m2. In this case, switches Q1 and Q2, inductor L, and capacitor C3 may together form switch converter 2'. The switch group (including switches Q1 and Q2) can be shared by switch converter 2' and switched capacitor converter 1'.

In switched capacitor converter 1', switches Q1 and Q4 may be controlled in response to a switch control signal GH, the switches Q2 and Q3 are controlled in response to switch control signal GL. In this particular example, switch control signal GH and switch control signal GL are mutually complementary. That is, when switch control signal GH is high, switch control signal GL is low, and vice versa. Switches Q1-Q4 are N-type MOSFETs in this particular example. Therefore, if switch control signal GH is high and switch control signal GL is low, switches Q1 and Q4 are on, and switches Q2 and Q3 are off. In this case, a loop starting from an input port and passing through switch Q4, capacitor C2, switch Q1, and capacitor C1 may be formed, and capacitors C1 and C2 can be charged with an input voltage. When switch control signal GL is high and switch control signal GH is low, switches Q1 and Q4 are off, and switches Q2 and Q3 are on. In this case, a loop including switch Q2, capacitor C2, switch Q3, and capacitor C1 may be formed, electric energy stored in capacitors C1 and C2 may supply power, and a voltage of each of the capacitors can be half of input voltage Vin. In this way, each of the capacitors can be alternately discharged/charged by repeatedly switching states of the switch groups, thereby achieving a substantially constant output.

It can be seen from the above description that a ratio between an output voltage and an input voltage of switched capacitor converter 1' can be fixed and independent from the duty cycle of switch control signals GH or GL. However, output voltage Vout of switch converter 2' may be determined based on a half of input voltage Vin (Vin/2) and the duty cycle of the switch control signals of switches Q1 or Q2. Therefore, a control circuit may be configured to adjust the duty cycles of switch control signals GH and GL based on a desired output voltage, and to maintain switch control signals GH and GL as complementary. Switched capacitor converter 1' may operate normally as long as switch control signals GH and GL are mutually complementary.

Switches Q1 and Q2 may be alternately switched on/off by controlling the duty cycles of the switch control signals, such that the charging duration and the discharging duration of inductor L and capacitor C3 can be controlled for power conversion at a second stage. With switch converter 2', voltage pulsation in the output of switched capacitor converter 1' that may be caused by charging/discharging of the capacitors and a power supply itself can be substantially eliminated, and a ratio between the output voltage and the input voltage may be adjusted, thereby adjusting the gain of the full DC-DC converter. For example, the gain of switched capacitor converter 1' is ½, and switch converter 2' with a buck topology may have a gain of less than 1.

Switches Q1 and Q2 of the shared switch group can be used to control the states of the circuit in switched capacitor converter 1', and to charge and discharge capacitors C1 and C2. In addition, switches Q1 and Q2 of the shared switch group can be used as a main power switch and a synchronous rectification switch in switch converter 2', in order to control the duration that inductor L stores energy and the duration that inductor L releases energy. As described above, since the gain of switched capacitor converter 1' is independent from the duty cycles of the switch control signals for switches Q1 and Q2, only switch converter 2' may be affected when the duty cycles of the switch control signals are changed. The control circuit may adjust the duty cycles of the switch control signals in any suitable manner, in order to adjust the state of the switch converter 2'. For example, such control may include a pulse-width modulation (PWM) manner, a pulse frequency modulation (PFM) manner, or a combination of the PWM manner and the PFM manner.

Figure 3:
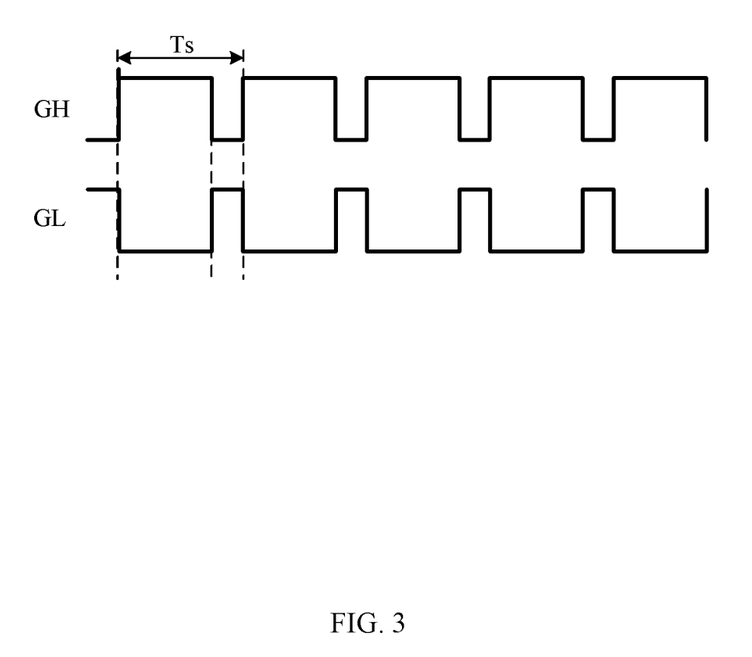
FIG. 3 is a waveform diagram of example operation of the switch control signals for PWM control of the first example DC-DC converter, in accordance with embodiments of the present invention.

Referring now to FIG. 3, shown is a waveform diagram of example operation of the switch control signals for PWM control of the first example DC-DC converter, in accordance with embodiments of the present invention. In this example, in each switch period Ts, switch control signals GH and GL are mutually complementary. When switch period Ts is constant, output voltage Vout may be adjusted by changing the duty cycle (e.g., when the switches are N-type MOSFETs, the duty cycle may be changed by changing a duration of a high level in each switch period).

Figure 4:
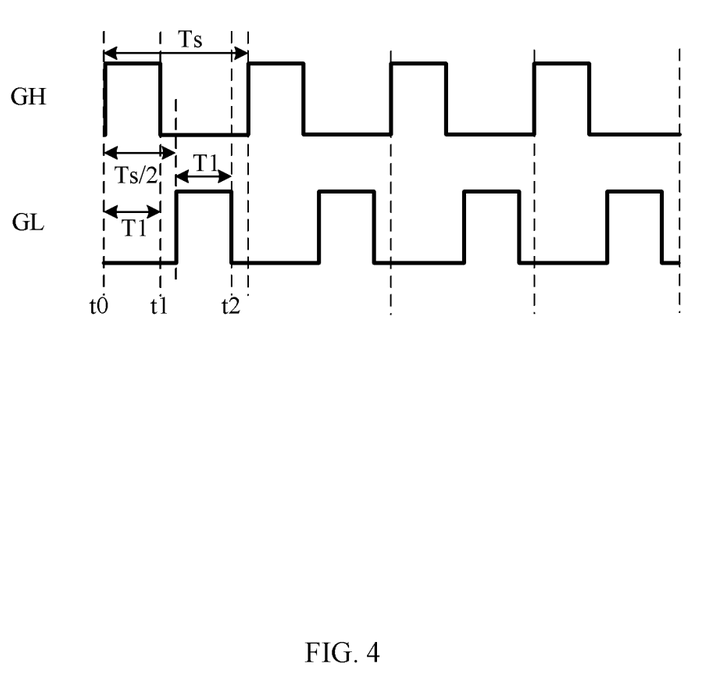
FIG. 4 is a waveform diagram of example operation of the switch control signals for another PWM control of the first example DC-DC converter, in accordance with embodiments of the present invention.

Referring now to FIG. 4, shown is a waveform diagram of example operation of the switch control signals for another PWM control of the first example DC-DC converter, in accordance with embodiments of the present invention. In this particular example, switch control signals GH and GL are mutually symmetrical. This indicates that the switch control signals GH and GL have the same waveform and duty cycle, and different phases. For example, in a first switch period Ts, the switch control signal GH may remain high for a duration T1 (e.g., from time t0 to time t1), and switch control signal GL may remain high for the same duration T1 (e.g., from time Ts/2 to time t2). That is, switch control signal GL may lag switch control signal GH by Ts/2; however, switch control signals GL and GH may have the same duty cycle. A dead time period may be inserted in the symmetrical signals when the switches of the switch groups change switch states. During the dead time period, the two switches of the given switch group are both switched off, in order to prevent the two switches from both being on during the transition. For switch converter 2', power conversion may still be achieved by alternately switching on/off switches Q1 and Q2 in response to the switch control signals shown. By adjusting the duty cycle of the switch control signals, the gain can be adjusted and a substantially constant output voltage is achieved.

Figure 5:
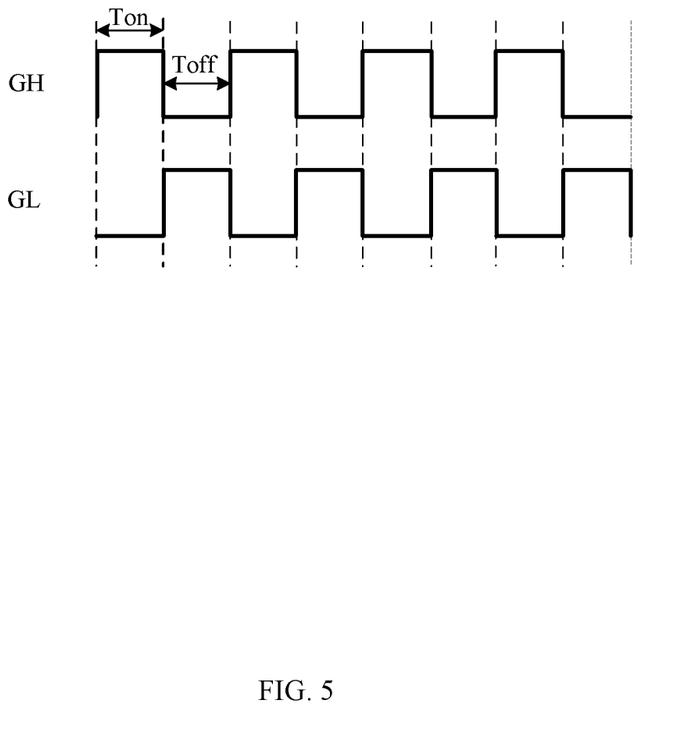
FIG. 5 is a waveform diagram of example operation of the switch control signals for PFM control of the first example DC-DC converter, in accordance with embodiments of the present invention.

Referring now to FIG. 5, shown is a waveform diagram of example operation of the switch control signals for PFM control of the first example DC-DC converter, in accordance with embodiments of the present invention. In this particular example, for switch control signals GH and GL, the switch period may not be constant, and a switched-on duration Ton or a switched-off duration Toff may be constant. The output voltage of switched capacitor converter 2' may also be adjusted by adjusting the switch period, or by changing the switching frequency. In particular embodiments, the switched capacitor converter and the switch converter are cascaded. Because the switched capacitor converter may include multiple switch groups, the switch converter can share one of the switch groups of the switched capacitor converter, which may effectively reduce the number, and increase the utilization, of the various circuit components. In addition, the sharing of the switch group brings no negative effects on operation of the switched capacitor converter, and a DC-DC converter of particular embodiments can achieve an adjustable gain and relatively smooth output voltage.

Further, switched capacitor converter 1' may be used as an input stage of the DC-DC converter, and switch converter 2' may be used as an output stage of the DC-DC converter. In this case, switch converter 2' can operate as a switch converter with a buck topology. In addition, switch converter 2' may also be used as the input stage and switched capacitor converter 1' may be used as the output stage. In this case, switch converter 2' can operate as a switch converter with a boost topology from port 22 to port 21 (see, e.g., FIG. 2). Moreover, switched capacitor converter 1' can perform bidirectional DC-DC conversion, and if switch converter 2' is also configured to perform bidirectional power conversion, the DC-DC converter may support bidirectional power conversion functionality. That is, an input of switched capacitor convertor 1' may be outputted to switch converter 2' after being converted (e.g., buck conversion), and an input of switch converter 2' may also be outputted to switched capacitor converter 1' after being converted (e.g., boost conversion).

Figure 6:
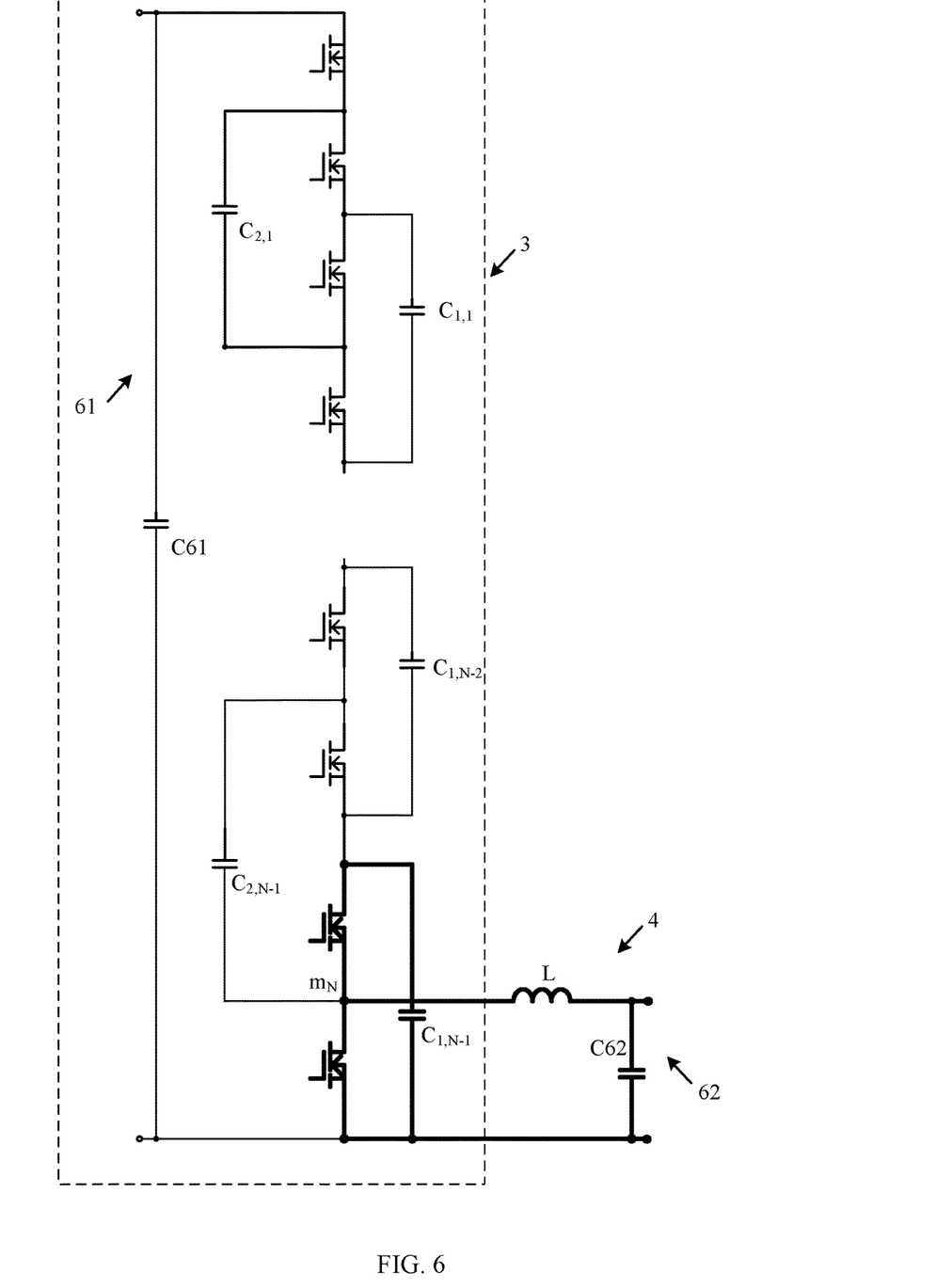
FIG. 6 is a schematic block diagram of an example variation of the first example DC-DC converter, in accordance with embodiments of the present invention.

Referring now to FIG. 6, shown is a schematic block diagram of an example variation of the first example DC-DC converter, in accordance with embodiments of the present invention. In particular embodiments, the number of the switch groups in the switched capacitor converter is not limited to two, but may be more than two switch groups based on a desired transformation ratio. In this example, switched capacitor converter 3 of the DC-DC converter can include N switch groups. Each of the switch groups can include two switches connected in series. The N switch groups can be coupled in series between two terminals of port 61 in a sequence. Switched capacitor converter 3 may further include capacitors $C_{1,1}$ to $C_{1,N-1}$ and $C_{2,1}$ to $C_{2,N-1}$. Capacitors $C_{1,1}$ to $C_{1,N-1}$ can be respectively coupled to a second to an N-th switch groups in parallel.

Each of capacitors $C_{2,1}$ to $C_{2,N-1}$ can connect between intermediate nodes of two adjacent switch groups. That is, capacitor $C_{2,i}$ can connect between intermediate node mi of an i-th switch group and intermediate node $m_{i+1}$ of an (i+1)-th switch group, where i=1, 2, . . . N. As shown, an N-th switch group may be shared by switch converter 4. Inductor L as a magnetic component can connect between intermediate node $m_N$ of the N-th switch group (e.g., a switch group closest to the ground) and one terminal of port 62. Alternatively, any one of the N switch groups may be shared by switch converter 4 to perform power conversion.

Moreover, capacitors C61 and C62 may be respectively coupled in parallel at ports 61 and 62 in order to smooth an input/output voltage of the port. Similar to the DC-DC converter of FIG. 2, this example DC-DC converter may also perform bidirectional power conversion. In a buck conversion, port 61 can be used as an input port, and port 62 may be used as an output port. In a boost conversion, port 61 can be used as an output port, and port 62 may be used as an input port. In addition, a ratio between voltages of ports 61 and 62 may be greater if N is greater than two. Also in particular embodiments, the switched capacitor converter may also be an isolated switched capacitor converter.

Figure 7:
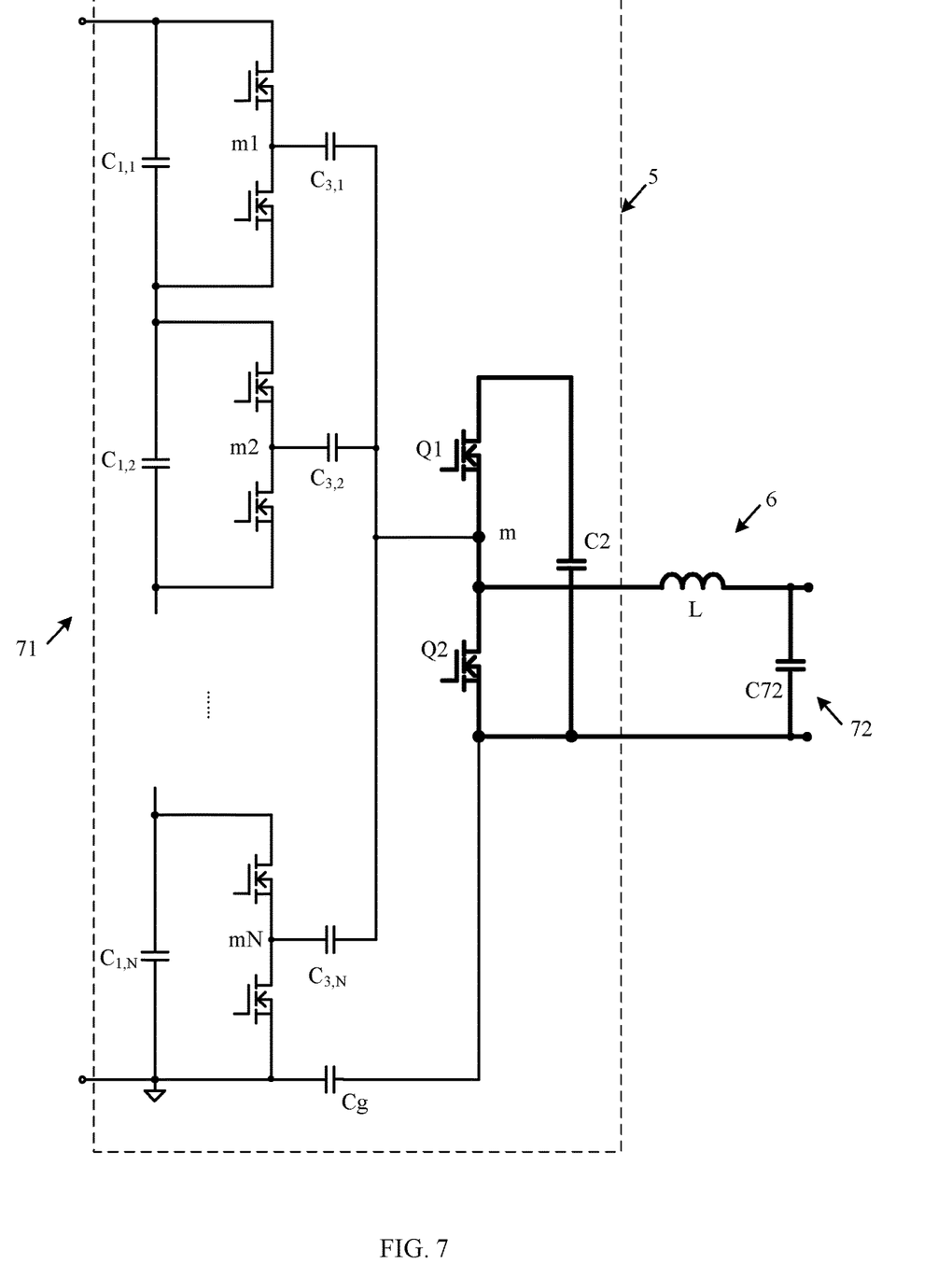
FIG. 7 is a schematic block diagram of a second example DC-DC converter, in accordance with embodiments of the present invention.

Referring now to FIG. 7, shown is a schematic block diagram of a second example DC-DC converter, in accordance with embodiments of the present invention. In this particular example, the DC-DC converter can include isolated switched capacitor converter 5 and switch converter 6. Switched capacitor converter 5 can include N first switch groups and one second switch group, where N is greater than or equal to two. Each of the switch groups can include two switches coupled in series. The N first switch groups can be coupled in series between two terminals of port 71 in a sequence. Switched capacitor converter 5 may further include capacitors $C_{1,1}$ to $C_{1,N}$, one capacitor C2 and capacitors $C_{3,1}$ to $C_{3,N}$. Capacitor $C_{1,i}$ can connect in parallel with an i-th first switch group, where i=1, 2, . . . N. Capacitor C2 can connect in parallel with the second switch group.

Capacitor $C_{3,i}$ can connect between intermediate node mi of an i-th first switch group and intermediate node m of the second switch group. With capacitors $C_{3,1}$ to $C_{3,N}$, ports 71 and 72 can effectively be isolated by switched capacitor converter 5, thereby substantially suppressing common mode noise at the input port. In this example, the second switch group may be shared by switch converter 6. The second switch group can include switches Q1 and Q2. Inductor L as a magnetic component can connect between intermediate node m of the second switch group and one terminal of port 72. Capacitor C72 can connect in parallel with port 72 to perform input filtering or output filtering. Alternatively or additionally, isolated capacitor Cg may be provided, whereby isolated capacitor Cg can connect between a grounded terminal of port 71 and a grounded terminal of port 72. Isolated capacitor Cg may alternatively be coupled between one terminal of port 72 and any one of coupling terminals of capacitors $C_{1,1}$ to $C_{1,N}$.

Since both switched capacitor converter 5 and switch converter 6 may perform bidirectional voltage conversion, the DC-DC converter may correspondingly perform bidirectional power conversion. In one configuration, port 71 can be used as an input port, and port 72 may be used as an output port. Switched capacitor converter 5 can perform voltage conversion for a first stage in an isolated manner, and switch converter 6 with a buck topology may perform voltage conversion for a second stage, thereby converting a higher voltage input from port 71 to a lower direct current (DC) voltage outputted from port 72. In another configuration, port 72 can be used as an input port, and port 71 may be used as an output port. Switch converter 6 may be a switch converter with a boost topology from port 72 to port 71. Switch converter 6 can perform the voltage conversion for the first stage, and switched capacitor converter 5 may perform the voltage conversion for the second stage, thereby converting a lower voltage input from port 72 to a higher direct current voltage output from port 71.

Figure 8:
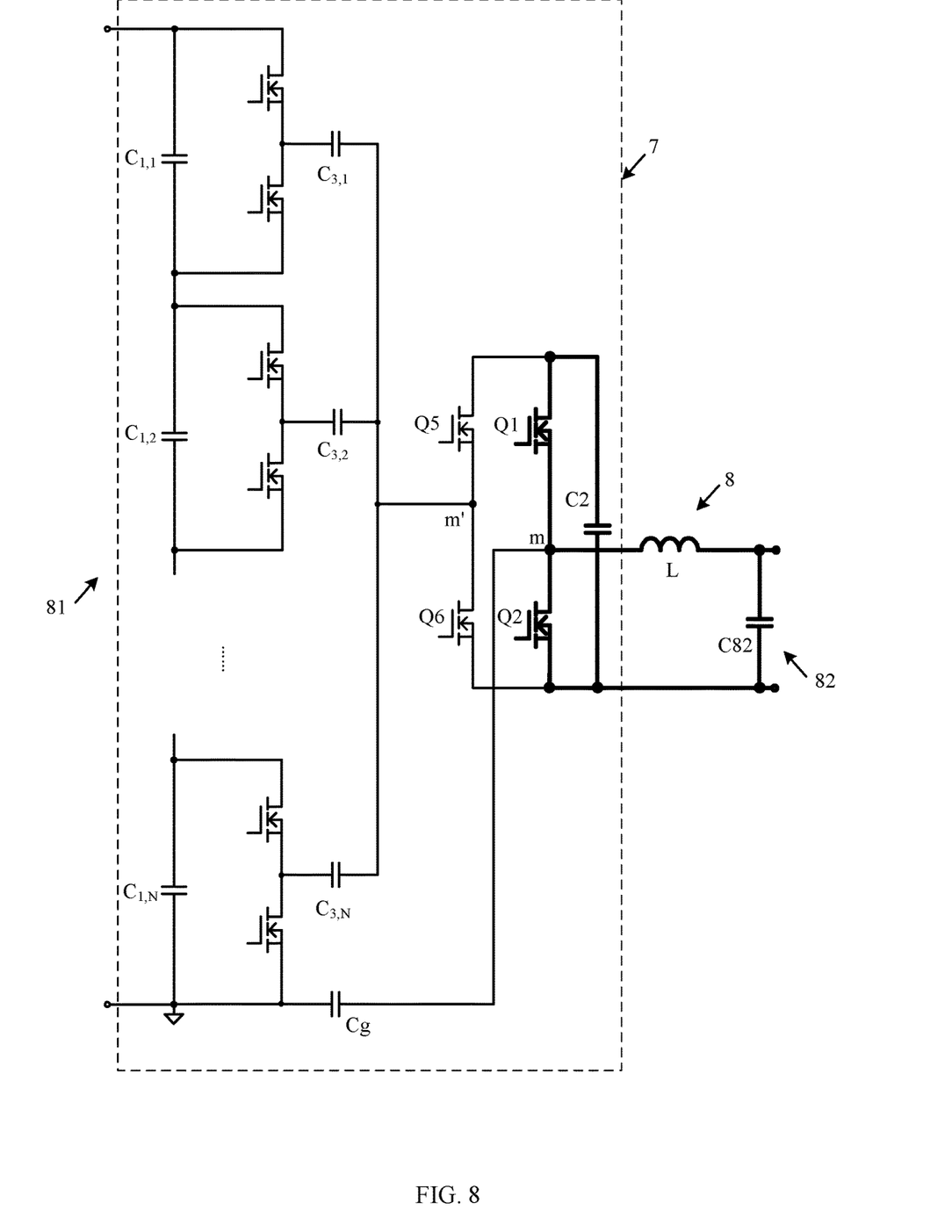
FIG. 8 is a schematic block diagram of a third example DC-DC converter, in accordance with embodiments of the present invention.

Referring now to FIG. 8, shown is a schematic block diagram of a third example DC-DC converter, in accordance with embodiments of the present invention. In this particular example, the DC-DC converter can include isolated switched capacitor converter 7 and switch converter 8, which are cascaded. Switched capacitor converter 7 may have the same or a similar structure as switched capacitor converter 5 shown in FIG. 7 at a side of port 81. In this example, switched capacitor converter 7 may be provided with two switch groups at a side near switch converter 8, that is, a second switch group (e.g., including switches Q1 and Q2) and a third switch group (e.g., including switches Q5 and Q6). The second and third switch groups can be coupled in parallel with each other. Switch converter 8 may share one switch group of switched capacitor converter 7 as a main switch and a synchronous rectification switch.

Capacitors $C_{3,1}$ to $C_{3,N}$ for isolation can be coupled to intermediate node m' of the third switch group. Inductor L of switch converter 8 can connect between one terminal of port 82 and intermediate node m of the second switch group. Capacitor C82 may further connect in parallel with port 82 to perform input filtering or output filtering. For example, isolated capacitor Cg may be provided, where one terminal of isolated capacitor Cg can connect to a grounded terminal of port 81, and the other terminal of isolated capacitor Cg can connect to intermediate node m of the second switch group. Inductor L of switch converter 8 can connect to intermediate node m of the second switch group to share the switch group (e.g., including switches Q1 and Q2). Since switched capacitor converter 7 and switch converter 8 may perform bidirectional power conversion, the DC-DC converter may correspondingly perform directional power conversion. That is, port 81 can be used as an input port and port 82 may be used as an output port, or port 82 can be used as an input port and port 81 may be used as an output port.

Figure 9:
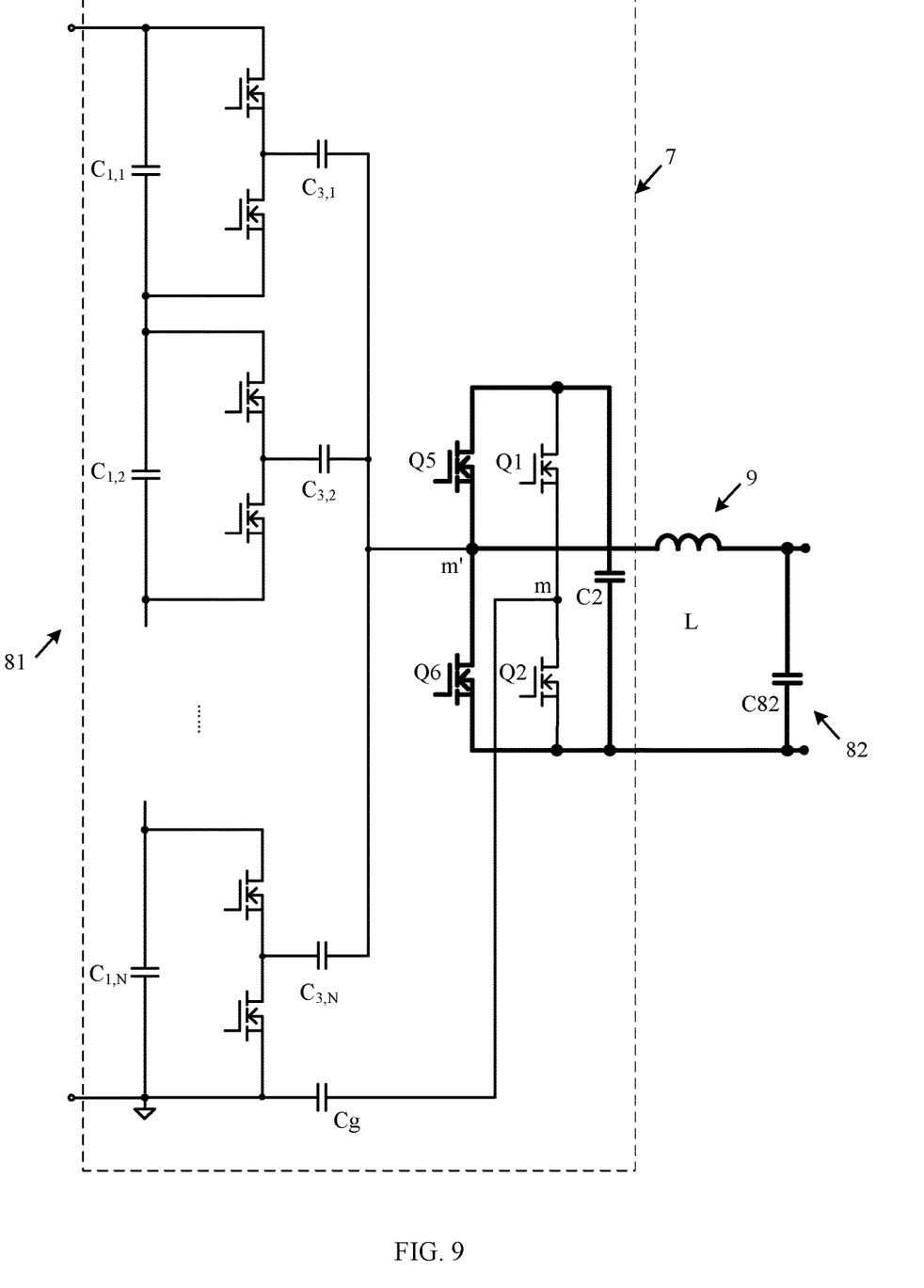
FIG. 9 is a schematic block diagram of an example variation of the third example DC-DC converter, in accordance with embodiments of the present invention.

Referring now to FIG. 9, shown is a schematic block diagram of an example variation of the third example DC-DC converter, in accordance with embodiments of the present invention. In this particular example DC-DC converter, inductor L of switch converter 9 can be coupled to intermediate node m' of the third switch group of switched capacitor converter 7 to share the switch group (e.g., including switches Q5 and Q6), thereby achieving the same power conversion effect as that of the example circuit of FIG. 8.

In particular embodiments, the switched capacitor converter may also be arranged in another equivalent structure including at least one switch group as described. In addition to the buck topology, the switch converter may also utilize any other suitable converter topologies, such as a boost topology, a boost-buck topology, and an LC resonant converter. In certain embodiments, the switched capacitor converter and the switch converter are cascaded to perform power conversion. Because the switches of each of the switch groups in the switched capacitor converter are alternately switched on/off, at least one switch group may be shared as a main switch and a synchronous rectification switch of a switch converter, thereby effectively reducing the number of switches and improving device utilization. In addition, a cascaded structure can combine advantages of the switched capacitor converter and the switch converter, such that the gain of the DC-DC converter can be changed, and the output voltage effectively smoothed. Moreover, since most switch converters may perform bidirectional power conversion, and the switched capacitor converter may perform bidirectional power conversion, the DC-DC converter can also achieve bidirectional power transmission.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A direct current-direct current (DC-DC) converter, comprising:
   a) a switched capacitor converter comprising at least one switch group and at least one capacitor, wherein each switch group comprises first and second switches coupled in series, the at least one capacitor is respectively coupled in parallel with a corresponding one of the switch groups, the at least one switch group comprises N switch groups, the at least one capacitor comprises N−1 first capacitors and N−1 second capacitors, N is greater than or equal to two, the N switch groups are sequentially coupled in series between two terminals of a first port, the N−1 first capacitors are respectively coupled in parallel with a second to a N-th switch groups, and an i-th second capacitor is coupled between an intermediate node of an i-th switch group and an intermediate node of an (i+1)-th switch group;
   b) a switch converter comprising a first magnetic component, wherein the switch converter is configured to share one of the switch groups, the first magnetic component is coupled between an intermediate node of the shared switch group and one terminal of a second port, and the intermediate node is a common coupling point of the first and second switches of the shared switch group; and
   c) a control circuit configured to generate switch control signals for controlling operation of the first and second switches in each switch group, wherein the switch control signals for the first and second switches have the same duty cycle and a phase difference.

2. The DC-DC converter of claim 1, wherein:
   a) the switched capacitor converter is configured as an input stage; and
   b) the switch converter is configured as an output stage with a buck topology.

3. The DC-DC converter of claim 1, wherein:
   a) the switch converter is configured as an input stage with a boost topology; and
   b) the switched capacitor converter is configured as an output stage.

4. The DC-DC converter of claim 1, wherein the switch converter is configured to perform bidirectional power conversion such that the DC-DC converter is configured to perform bidirectional DC-DC conversion.

5. The DC-DC converter of claim 1, wherein the control circuit is configured to adjust the duty cycles of the first and second switches in the shared switch group, in order to adjust an output voltage of the DC-DC converter based on a voltage conversion of the switched capacitor converter.

6. The DC-DC converter of claim 1, wherein the phase difference between the first switch and the second switch in each switch group is controlled to avoid the switch control signals of the first and second switches being overlapped.

7. The DC-DC converter of claim 1, wherein the switched capacitor converter comprises an isolated switched capacitor converter.

8. The DC-DC converter of claim 1, wherein the switched capacitor converter comprises a non-isolated switched capacitor converter.

9. The DC-DC converter of claim 1, wherein:
   a) the at least one switch group comprises N first switch groups and one second switch group;
   b) the at least one capacitor comprises N first capacitors, one second capacitor, and N third capacitors;
   c) the N first capacitors are respectively coupled in parallel with the N first switch groups;
   d) first terminals of the N third capacitors are coupled to an intermediate node of the second switch group;
   e) second terminals of the N third capacitors are respectively coupled to intermediate nodes of the N first switch groups correspondingly;
   f) the second capacitor is coupled in parallel with the second switch group; and
   g) the first magnetic component is coupled between the intermediate node of the second switch group and one terminal of the second port.

10. The DC-DC converter of claim 9, wherein the at least one capacitors comprises at least one isolation capacitor coupled between one terminal of the second port and any one of coupling terminals of the N first capacitors.

11. The DC-DC converter of claim 1, wherein:
a) the at least one switch group comprises N first switch groups, one second switch group, and one third switch group;
b) the at least one capacitor comprises N first capacitors, one second capacitor, and N third capacitors;
c) the N first capacitors are respectively coupled in parallel with the N first switch groups, first terminals of the N third capacitors are coupled to an intermediate node of the third switch group;
d) second terminals of the N third capacitors are respectively coupled to intermediate nodes of the N first switch groups correspondingly;
e) the second switch group is coupled to the third switch group in parallel;
f) the second capacitor is coupled to the second switch group in parallel; and
g) one terminal of the first magnetic component is coupled to an intermediate node of the second switch group or the intermediate node of the third switch group, and another terminal of the first magnetic component is coupled to one terminal of the second port.

12. The DC-DC converter of claim 11, wherein the at least one capacitor comprises at least one isolated isolation capacitor coupled between the intermediate node of the second switch group and any one of coupling terminals of the N first capacitors.

13. The DC-DC converter of claim 11, wherein:
a) the first port is an input port; and
b) the second port is an output port.

14. The DC-DC converter of claim 11, wherein:
a) the first port is an output port; and
b) the second port is an input port.

* * * * *